United States Patent
Ortega et al.

(10) Patent No.: US 10,277,656 B2
(45) Date of Patent: Apr. 30, 2019

(54) METHOD AND SYSTEM FOR DELIVERING MEDIA DATA

(71) Applicant: FiveOpenBooks, LLC, San Jose, CA (US)

(72) Inventors: Antonio Ortega, Los Angeles, CA (US); Axel Becker-Lakus, San Jose, CA (US)

(73) Assignee: FiveOpenBooks, LLC, San Jose, CA (US)

( * ) Notice: Subject to any disclaimer, the term of this patent is extended or adjusted under 35 U.S.C. 154(b) by 94 days.

(21) Appl. No.: 15/135,615

(22) Filed: Apr. 22, 2016

(65) Prior Publication Data

US 2016/0241627 A1 Aug. 18, 2016

Related U.S. Application Data

(63) Continuation-in-part of application No. 10/059,282, filed on Jan. 29, 2002, now Pat. No. 9,350,782.

(51) Int. Cl.
| | |
|---|---|
| *H04L 9/30* | (2006.01) |
| *H04L 29/06* | (2006.01) |
| *H04L 29/08* | (2006.01) |
| *H04N 19/30* | (2014.01) |
| *H04N 19/61* | (2014.01) |
| *H04N 21/63* | (2011.01) |
| *H04N 21/647* | (2011.01) |
| *H04N 21/2343* | (2011.01) |

(Continued)

(52) U.S. Cl.
CPC .............. *H04L 65/80* (2013.01); *H04L 9/302* (2013.01); *H04L 29/06027* (2013.01); *H04L 63/0428* (2013.01); *H04L 65/4084* (2013.01); *H04L 65/602* (2013.01); *H04L 65/607* (2013.01); *H04N 19/61* (2014.11); *H04N 21/2347* (2013.01); *H04N 21/234327* (2013.01); *H04N 21/4788* (2013.01); *H04N 21/632* (2013.01); *H04N 21/64792* (2013.01); *H04L 67/06* (2013.01); *H04N 19/30* (2014.11)

(58) Field of Classification Search
CPC ........... H04N 7/16; G06F 21/10; G06F 21/64; G06K 2009/00583; H04L 65/4084; H04W 12/08
See application file for complete search history.

(56) References Cited

U.S. PATENT DOCUMENTS

| | | | | |
|---|---|---|---|---|
| 5,606,372 A | * | 2/1997 | Kim | ....................... H04N 19/60 375/240.03 |
| 5,687,095 A | * | 11/1997 | Haskell | ................ H04N 21/236 348/386.1 |

(Continued)

*Primary Examiner* — David R Lazaro
(74) *Attorney, Agent, or Firm* — Artie Pennington; Hunt Pennington Kumar & Dula, PLLC

(57) ABSTRACT

For use in media communications, e.g., in the delivery of video and audio or in teleconferencing, a media file or title is partitioned for secured, efficient delivery. A data sequence representing the file is partitioned into smaller subsequences, with a first subsequence being chosen to convey a degrade-quality representation of the data, and the other sequences for complementing the first subsequence to obtain a superior-quality representation. Among areas of applicability are media on demand, real-time communications and broadcasting, and online media locker, jukebox, and chat room services.

14 Claims, 4 Drawing Sheets

(51) Int. Cl.
*H04N 21/2347* (2011.01)
*H04N 21/4788* (2011.01)

(56) References Cited

U.S. PATENT DOCUMENTS

| | | | | |
|---|---|---|---|---|
| 5,768,535 A * | 6/1998 | Chaddha | H04N 7/17336 | 348/E7.073 |
| 5,828,788 A * | 10/1998 | Chiang | H04N 19/37 | 375/240.12 |
| 5,933,193 A * | 8/1999 | Niesen | H04N 19/147 | 375/240.03 |
| 5,986,711 A * | 11/1999 | Pau | H04N 19/61 | 375/240.18 |
| 6,075,906 A * | 6/2000 | Fenwick | G06T 3/4023 | 348/581 |
| 6,091,777 A * | 7/2000 | Guetz | H04N 19/172 | 375/240.03 |
| 6,104,757 A * | 8/2000 | Rhee | H04B 1/66 | 375/240.12 |
| 6,185,312 B1 * | 2/2001 | Nakamura | G06T 1/0057 | 283/113 |
| 6,285,774 B1 * | 9/2001 | Schumann | H04N 5/913 | 375/E7.026 |
| 6,363,119 B1 * | 3/2002 | Oami | H04N 19/13 | 375/240.03 |
| 6,414,992 B1 * | 7/2002 | Sriram | H04N 19/56 | 375/240.02 |
| 6,459,452 B1 * | 10/2002 | Simon | H04N 19/61 | 375/240.16 |
| 6,496,980 B1 * | 12/2002 | Tillman | H04N 7/17318 | 348/E7.071 |
| 6,563,876 B2 * | 5/2003 | Boyce | G06T 3/40 | 348/567 |
| 6,637,031 B1 * | 10/2003 | Chou | H04N 7/17336 | 348/384.1 |
| 6,650,783 B2 * | 11/2003 | Hamanaka | H04N 19/37 | 375/240.16 |
| 6,668,246 B1 * | 12/2003 | Yeung | G06F 21/10 | 380/211 |
| 6,697,341 B1 * | 2/2004 | Roy | H04M 3/567 | 370/260 |
| 6,745,226 B1 * | 6/2004 | Guedalia | G06F 3/16 | 707/E17.109 |
| 6,771,703 B1 * | 8/2004 | Oguz | G11B 27/034 | 375/240.03 |
| 6,778,553 B1 * | 8/2004 | Chou | H04H 20/42 | 370/465 |
| 6,789,123 B2 * | 9/2004 | Li | H04L 29/06027 | 370/232 |
| 6,871,006 B1 * | 3/2005 | Oguz | G11B 27/031 | 348/E7.073 |
| 6,934,403 B2 * | 8/2005 | Joo | G06T 1/0057 | 382/100 |
| 6,937,770 B1 * | 8/2005 | Oguz | H04N 19/176 | 375/240.2 |
| 6,956,899 B2 * | 10/2005 | Hall | H04N 19/176 | 375/240 |
| 6,957,350 B1 * | 10/2005 | Demos | H04N 5/14 | 348/E5.108 |
| 6,980,667 B2 * | 12/2005 | Hamanaka | H04N 19/29 | 375/E7.079 |
| 7,010,570 B1 * | 3/2006 | Boies | G06Q 30/018 | 705/317 |
| 8,160,293 B1 * | 4/2012 | Fridrich | G06K 9/00899 | 382/100 |
| 9,031,329 B1 * | 5/2015 | Farid | G06K 9/00577 | 382/209 |
| 9,336,556 B2 * | 5/2016 | Kawazu | G06T 1/0028 | |
| 2001/0019630 A1 * | 9/2001 | Johnson | H04N 19/30 | 382/232 |
| 2001/0042048 A1 * | 11/2001 | Boykin | G06F 21/10 | 705/51 |
| 2002/0032027 A1 * | 3/2002 | Kirani | G06T 9/007 | 455/412.1 |
| 2002/0095582 A1 * | 7/2002 | Peled | G06F 21/10 | 713/180 |
| 2002/0150158 A1 * | 10/2002 | Wu | H04N 19/51 | 375/240.12 |
| 2003/0169932 A1 * | 9/2003 | Li | G06T 9/00 | 382/239 |
| 2005/0002578 A1 * | 1/2005 | Mitchell | G06F 12/0875 | 382/233 |
| 2006/0031558 A1 * | 2/2006 | Ortega | H04L 29/06027 | 709/232 |
| 2007/0156594 A1 * | 7/2007 | McGucken | G06F 21/10 | 705/51 |
| 2009/0154809 A1 * | 6/2009 | Fridrich | G06K 9/40 | 382/181 |
| 2009/0307227 A1 * | 12/2009 | Prestenback | H04N 7/17318 | |
| 2012/0194519 A1 * | 8/2012 | Bissell | G06F 17/30905 | 345/428 |
| 2016/0085994 A1 * | 3/2016 | Pereira | G06F 21/6272 | 726/26 |
| 2016/0241627 A1 * | 8/2016 | Ortega | H04L 65/80 | |

* cited by examiner

METHOD AND SYSTEM FOR DELIVERING MEDIA DATA

CROSS-REFERENCE TO RELATED APPLICATIONS

This application is related to the following:
1. U.S. application Ser. No. 10/059,282, filed 29 Jan. 2002 ("Related Application 1").
This application is a Continuation-in-Part of Related Application 1.
The subject matter of the Related Application 1, in its entirety, is expressly incorporated herein by reference.

TECHNICAL FIELD

The present invention is concerned with techniques for transmitting and delivering media data in a communications network.

BACKGROUND OF THE INVENTION

Communications networks, e.g., the Internet, are finding increasing use for commercial delivery of proprietary media/multimedia data to clients/users. Such data is in digital form, and may represent a still image, a video sequence, or an audio sequence of voice or music, for example. Rendering of time-based digital media such as audio, speech or video involves producing a series of outputs over a period of time, e.g., a video frame every 1/30-th of a second in the case of video NTSC output.

Where such data is proprietary, as under copyright, there are concerns with unauthorized access at intermediate points along the transmission path, as well as with users who have gained authorized access to the data then allowing others to copy and use the data without authorization. In view of such concerns, security measures are required for preventing contents from becoming available at intermediate points and for restricting access to the data to those who have been properly authorized. Such measures may include encryption as well as partitioning of data for transmission of the individual parts over distinct paths. In the latter case, parts are chosen so that no one of them provides a good approximation to the original content, thus requiring complete assembly of all parts for content to become available at good quality to an authorized recipient. Similar concerns arise with respect to security and privacy in communications over an open network, especially in real-time communication between users and in real-time broadcasting of potentially sensitive information.

Data representing media content tends to be voluminous, and its protection typically entails considerable complexity and transmission costs: in encryption, in transmission over a secure server, and in the use of streaming in preference to downloading to make copying more difficult.

SUMMARY OF THE INVENTION

In accordance with at least one embodiment, a method is provided for delivering media data, comprising the steps of (a) forming a plurality of subsets of the data, comprising a first subset which conveys a first, degraded quality representation of the data and at least one further subset here designated as a second subset which in combination with the first subset conveys a second representation of the data with quality superior to the first representation the second subset being chosen to enable a classification and or identification of the imaging device having produced said data; and (b) delivering at least one data subset to at least one destination.

In accordance with a different embodiment, a method for delivering media data, said method comprising the steps of (a) forming a plurality of subsets of said data, said plurality of subsets comprising a first subset which conveys a first, degraded quality representation of said data, a second subset which in combination with said first subset conveys a second representation of said data with quality superior to said first representation, and wherein said second subset is chosen to enable a selected one of a classification and identification of an imaging device having produced said data, and (b) delivering at least one data subset to at least one destination.

In accordance with a different embodiment, a delivery system for media data, comprising (a) a partitioning module adapted to form a plurality of subsets of the data, said plurality of subsets comprising a first subset which conveys a first, degraded quality representation of said data, a second subset which in combination with said first subset conveys a second representation of said data with quality superior to said first representation, and wherein said second subset is chosen to enable a selected one of a classification and identification of an imaging device having produced said data, and (b) a delivery module adapted to deliver at least one subset to at least one destination.

In accordance with a different embodiment, a method for controlling access to a visual media data in a social network, said social network comprising a plurality of user units coupled to a social network site server, said social network site server being coupled to a database and a media server storing visual media posted by users of the social network, each of said plurality of user units comprising a processor and a display, the method comprising the steps of (a) receiving, by a visual media server, said visual media data from a selected one of the plurality of user units, said selected one of the plurality of user units executing a client application, said client application operable to form a plurality of subsets of said visual media data, said plurality of subsets comprising, a first subset which conveys a first, degraded quality representation of said visual media data, and at least one additional subset which in combination with said first subset conveys a second representation of said visual media data with quality superior to said first degraded quality representation, and (b) making said visual media data available to a least one destination, said destination comprising at least one of said user units, said user unit having a predefined user access level

BRIEF DESCRIPTION OF THE DRAWING

The invention may be more fully understood by a description of certain preferred embodiments in conjunction with the attached drawings in which.

Figure 1:
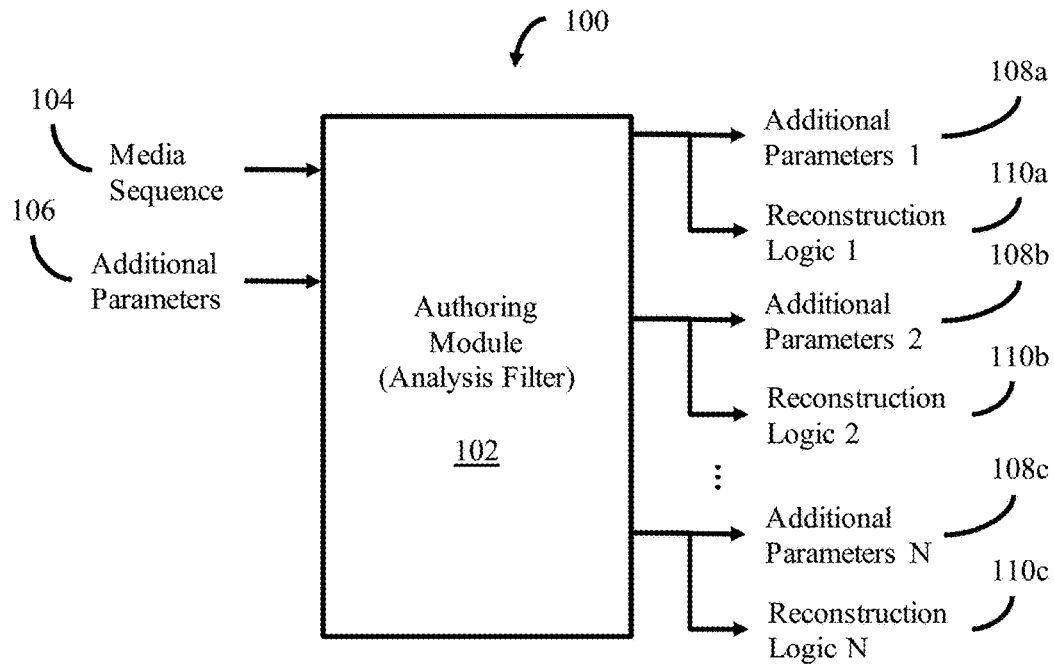
FIG. 1 illustrates, in block diagram form, an authoring system according to some embodiments.

In the drawings, similar elements will be similarly numbered whenever possible. However, this practice is simply for convenience of reference and to avoid unnecessary proliferation of numbers, and is not intended to imply or suggest that the invention requires identity in either function or structure in the several embodiments.

DETAILED DESCRIPTION

Requirements in Media Content Protection

Content protection for digital media serves to ensure that access to the content is restricted to those who have been authorized by the content owner, and that the access follows the rules set by the content owner. It may be required, for example, that user access to video content be limited to a certain access level defined by the number of viewings, to viewing in a pre-specified window of time or to viewing in a pre-specified quality, a pre-defined degradation level and that different users are entitled to different access levels In another example involving third parties, once a user has legitimate access to content, protection may be against his allowing others to copy and use the content without the originator's authorization. In yet another example involving third parties, a user provides original content to a social network and seeks privacy protection from the provider, the social networking site or other users of the social networking site.

As compared with providing copyright protection for published books, for example, protection in digital media delivery is more involved for two major reasons. First, copying digital content tends to be easy and can be performed without loss of quality in copying, especially when an open system, e.g., a PC, is used to view content. Second, content may be delivered in different forms, to different types of terminals. For example, one terminal may be a closed system, e.g., a TV set-top box, and another an open system such as a PC or mobile devices such as smart phones or tablets. Moreover, the distribution mechanism need not be uniform, as it may include means such as direct satellite broadcasting, Internet streaming, or distribution of content in a recorded physical medium such as a disk, for example, or in yet another example delivery can occur by means of posts to social networks and social networking sites that are stored on social network site servers. A content owner or service provider will seek to secure the content in all cases and regardless of differences in delivery formats and means.

There are three aspects of delivery systems which are considered as particularly important. First, decoder means should be inexpensive, as with set-top boxes or other hardware to be bought by the end user, and decoding should be fast, e.g., when effected in a PC. As the cost and complexity of decoding a video stream is fairly constant, once a video compression standard has been selected, encoding should be secure without adding too much complexity in decoding. Second, complexity should be low also at the server, especially if the content has to be encrypted anew each time it is sent to a different user. As the complexity of both encryption and decryption typically scales with the total number of bits that need to be encrypted/decrypted, a scheme would be desirable that can provide a desired level of protection of content while encrypting the smallest percentage of bits. The third aspect is with content protection desirably offering easy preview of content.

Estimating the Level of Protection

In a cryptographic system, input data is mapped to an output through a reversible process determined by a key, typically making the output to appear as random. If the length of the output is N symbols and the alphabet size is M, a truly random output can be any one of $M^N$ different strings of symbols. In cryptography instead, the number of possible outputs depends on the size of the key, being equal to $2^L$ for a key with L bits. Through encryption with a key of length L bits, a given media content stream is mapped into one of $2^L$ possible streams. Then, on gaining access to the key, an end user can reverse the encryption process and access the content. The security of a cryptography system depends directly on key length, and so does computational complexity, in encryption as well as in decryption. For encryption of N bits of data, the over-all complexity is O(L•N) which can be substantial. For example, in the RSA cryptographic algorithm (named after its originators Rivest, Shamir and Adleman), encryption and decryption involve exponentiation by a large integer followed by a modulo operation.

In systems of the present invention, input data is processed to extract content-dependent key information whose length in bits here is denoted by L'. Such information can be extracted in different ways which share the following characteristics: (i) For a user without access to the data removed, the number of possible inputs that lead to the output observed by him is roughly $2^{L'}$, and (ii) L' can be very large without affecting the complexity of the system which is O(K•N), where K essentially depends on the algorithm but not on L'. Thus, without increased complexity in decoding with the key, the number of possibilities that have to be searched to obtain the original signal without the key can be made very large. Further encryption for protecting the L' key bits is not precluded. By selecting a suitable key extraction mechanism, a user can be provided with previews at a desired level of quality.

Extraction Algorithm

Of multimedia data, inexact copies can be useful. For example, in lossy compression, decoded signals differ from the original, yet are perceptually indistinguishable from it. Moreover, as described above, a standard lossy compression scheme can provide multiple compressed versions of the same signal, all of which can be decoded and displayed, albeit at different quality levels.

A compression system involves one encoder and at least one decoder. The encoder generates a compressed representation of the signal that can be read by the decoder to produce an approximation to the input signal. Open international standards developed to date, including such broadly used standards as MPEG-2 or JPEG, specify the syntax of the bit stream exchanged by encoder and decoder. Their goal is to maintain inter-operability between encoders and decoders of different vendors. The standards prescribe how the decoder should interpret a bit stream, and the operations to be performed on the data to reconstruct the signal. However, the standards documents do not specify how the encoding process needs to be performed, only how the encoder can represent the information to be sent to the decoder. Thus, many different encoding strategies can be employed while still preserving syntax compatibility with a standard decoder, e.g., as based on the MPEG-2 standard, in the sense of the decoder being able to decode the information.

For protection of compressed media files, a cryptographic algorithm customarily is applied directly to the compressed stream, which then is no longer syntax-compatible. Alternatively, if a cryptographic algorithm is applied to a portion of a stream, then even in cases where compatibility with a standard is preserved, quality may be degraded in an uncontrolled fashion. With such schemes, a preview of the media stream requires a separate, low-resolution file. Known techniques for providing the latter result in inefficiency, e.g., when a so-called scalable video coding is used, particularly when the preview is distributed first and the rest of the signal is provided only to those end users that have been granted access. In this case, the preview containing a small portion of the data is pre-positioned, i.e., available to the end user, and a large amount of additional data has to be transmitted to view the signal at the higher resolution. The additional data has the most value, and its encryption and decryption will be costly.

In a standard scalable system, two data sets are derived from an original compressed video, namely a base layer with rate Rb and an enhancement layer with rate Re, where Rb<<Re. For preventing unauthorized access beyond the low resolution preview, the enhancement layer has to be fully encrypted, or else a selective encryption would have to be performed to guard against decoding of the enhancement.

In accordance with an aspect of the present invention, designated as reverse scalability, a low-resolution preview file in fact contains most of the data, typically by a wide margin, so that Rb>>Re using the above notation. For example, and typically for preferred partitioning techniques of the invention, the low-resolution file contains at least 80% or even 95% of the total data. In partitioning, information can be removed at different stages of encoding, desirably while preserving syntax compatibility.

Privacy/Security in Network Communications

Characteristics of a reverse-scalable system are advantageous also for security and privacy in communications over an open network such as the Internet, especially in real-time applications such as VoIP (Voice over Internet Protocol), video conferencing, and real-time broadcasting where potentially sensitive information may be transmitted. As an example, for reasons of privacy, a corporation will have reservations against use of an open network for conducting remote business meetings. Then, for economy over a purely private network, use of a so-called virtual private network (VPN) may be considered. Typically, such use is at a cost which directly depends on data volume, and the corporation will benefit from techniques for minimizing the amount of data transmitted over the VPN.

Specifically, with respect to video data, for example, content can be separated into subsequences at the source, or at network gateways. A relatively small subsequence can be formed to convey key information, while a much larger subsequence provides a low-quality approximation to the signal which by itself may be essentially useless. Transmission of the small subsequence, encrypted, will be less costly as compared with secure transmission of the original content in its entirety, and the large subsequence may be transmitted openly and at low cost like a standard stream. Furthermore, as the large subsequence is in a standard format, standard techniques can be used for providing robust communication through the channel. For example, the transmission rate of the large subsequence can be varied by using rate control techniques to accommodate changes in network bandwidth. Also, the large subsequence can be separated into portions receiving different levels of error protection.

Description of Exemplary Methods for Reverse Scalability

FIG. 1 illustrates, in block diagram form, an authoring system 100 according to some embodiments. In this embodiment, authoring system 100 includes an authoring module 102 accepting media sequence input 104 and additional parameter input 106, and generating N subsequences 108 along with respective reconstruction logic 110. The authoring module 102 serves for analyzing and splitting the input sequence into the subsequences 108, and generates the reconstruction logic 110 for recombining some or all of the subsequences 108 after their delivery. The reconstruction logic 110 may be bundled together with the subsequences 108, or, in a different embodiment, they may be made available independently. The subsequences 108 may be delivered in various ways, such as downloading or streaming, for example.

In downloading, a data file is delivered in its entirety prior to its use, e.g., by direct server-to-client transfer, by transfer to the client from a third processor acting as caching proxy, or by a transfer from another user in possession of the file as in a so-called peer-to-peer network. Alternatively, in streaming, use of a data file overlaps in time with its delivery, with use starting as soon as a sufficient amount of information has been received. For example, a few seconds worth of music is typical in the case of an audio file with playback continuing while additional data is being delivered. Processing for streaming is more complex as compared with downloading, and replicating such processing at several locations, e.g., mirrors or proxies in a network tends to be costly. As an example of a low-cost system, in a peer-to-peer system, file distribution is based on downloading, with file content being obtained from different parts of a network. In such a system the central server may provide mere directory information.

Figure 2:
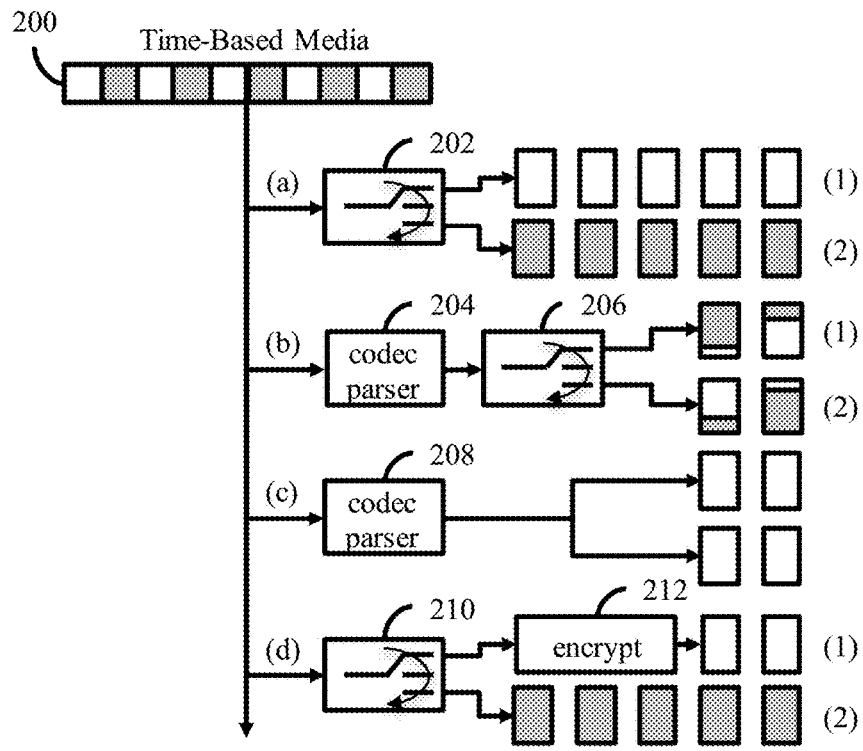
FIG. 2 illustrates, in block diagram form, exemplary variants for partitioning a time-based media sequence within the authoring system illustrated in FIG. 1 according to some embodiments.

FIG. 2 illustrates, in block diagram form, exemplary variants for partitioning a time-based media sequence 200 within the authoring system illustrated in FIG. 1 according to some embodiments. As illustrated, according to some embodiments, the time based media sequence 200 is split into two subsequences. According to exemplary variant (a) switch 202 splits time-based media sequence 200 into two subsequences, allocating bits to subsequence 1 and subsequence 2 based on a chosen splitting scheme which does not rely on knowledge of any coding format adhered to in the time-based media sequence 200. According to exemplary variant (b), the analyzer utilizes certain known coding information. This coding information may, according to some exemplary embodiments, enable splitting such that at least one of the subsequences may be playable to some extent, albeit abbreviated or at a lower quality. According to this exemplary variant, code parser 204 first parses the time-based media sequence 200 as a function of and based upon the coding information adhered to in the time-based media sequence 200. The resulting parsed sequence is subsequently split by switch 206 into two subsequences, allocating bits to subsequence 1 and subsequence 2. According to exemplary variant (c), time-based media sequence 200 is split by analyzer 208, here illustrated as a codec parser, without any further partitioning prior to delivery. In each of the cases, the original time-based media sequence 200 as well as, or alternatively, any of the subsequences may be encrypted, concomitantly requiring decryption after delivery.

FIG. 2 illustrates yet another exemplary variant (d) for analyzing and splitting a time-based media sequence 200 into subsequences, here illustrated as subsequence 1 and subsequence 2. According to this embodiment and as illustrated, the input sequence is split into two data subsets of the time-based media sequence 200. One generated data subset is encrypted, here illustrated as encrypt 212, thus providing privileged access to the content. The aforementioned encryption may be performed according to any one of a variety of encryption algorithms, as understood by one of ordinary skill in the art. The second generated data subset is transmitted over a communication channel that is accessible to the general public such as a web site, internet forum, social media, or a private but insecure communication channel. According to exemplary variant (d), switch 210 splits time-based media sequence 200, allocating bits to one or the other of subsequence 1 and subsequence 2, as a function of and based on a splitting scheme that generates subsequence 2 contains information specific to the image capturing device having produced the time-based media sequence 200 data allowing a classification and characteristic description of the image capture device. According to one exemplary embodiment, switch 210 allocates high frequency information to the second generated data subset, here illustrated as subsequence 2, which to a person skilled in the art is suitable to classify and/or to identify the imaging device as, e.g., as described by H. Farid in "Digital Image Forensics", available at: http://www.cs.dartmouth.edu/farid/downloads/tutorials/digitalimageforensics.pdf, or by N. Khanna et al. in "Forensic Camera Classification: Verification of Sensor Pattern Noise Approach", available at: https://engineering.purdue.edu/~prints/public/papers/khanna_f-sc.pdf, each expressly incorporated herein in its entirety by reference.

As an example, according to one embodiment, let I(x,y) denote an image with x=1, . . . , m and y=1, n. Let Y(x,y) be the incident light intensity at pixel (x,y). The sensor output of the imaging device can be presented as $$I = g^{\gamma}[(1+K)Y+\Omega]^{\gamma} + Q, \qquad \text{(Equation 1)}$$

where g denotes the gain and $\gamma$ the gamma correction, Q additive noise such as, e.g., resulting from JPEG compression. In the model above K denotes a zero-mean noise-like signal that is responsible for the PRNU (photo response non uniformity) that is a fingerprint of an imaging sensor. This PRNU is stable through the lifespan of an imaging sensor, yet stochastic. The PRNU is estimated from a set of images taken by the imaging sensor, the set typically containing smooth image content and high light intensity but not high enough to saturate the potential wells of the imaging sensor, as would be understood by one of ordinary skill in the art. For example, to estimate K, an observed image I is denoised and the denoised version of I is subtracted from both I and $g^{\gamma}[(1+K)Y+\Omega]^{\gamma} + Q$ in the equation above and W denotes the residual between the observed photo I and the denoised image.

The PRNU is robust against image filtering operations, i.e., lossy image compression, such as JPEG, or gamma correction and independent of the camera optics, camera settings, or scene content. As an example, the PRNU is robust against manipulating DC and AC coefficient as described in Related Application 1. The PRNU is used for various image forensic tasks such as device identification, i.e., was the photo taken with a given camera, or device linking, i.e., were two photos taken by the same camera, by employing a two channel hypothesis according to one embodiment, e.g., for two given device fingerprints K_1 and K_2, the hypothesis H1: K_1≠K_2 and H2: K_1=K_2 is tested.

Social networks often apply geometric transformations such as down sampling, cropping or rotation during uploading a user photo. This geometric transformation is denoted by T. According to one embodiment the inverse transformation T^(−1) is employed to a downgraded photo, such as a photo obtained from a social networking site, to match the sensor fingerprint factor K described previously estimated in the domain before the degradation caused by the geometric transformation.

According to an alternative embodiment, switch 210 is a function of the image content and the imaging device to ensure that only the first generated data subset provides privileged access to the media content where the media content may include a text document. The function incorporated in switch 210 can depend on pattern noise which, in more detail, can consist of, e.g., pixel defects, fixed pattern noise, photoresponse nonuniformities, or read out noise as understood by one of ordinary skill in the art.

Referring again to FIG. 2, according to a different embodiment, switch 210 allocates bits suitable to classify and/or identify the imaging device independently and without any knowledge of any coding format adherent to in the time-based media sequence 200. In another embodiment, the switch 210 allocates bits suitable to classify and/or identify the imaging device with knowledge of the coding format adherent to in the time-based media sequence 200.

Figure 3:
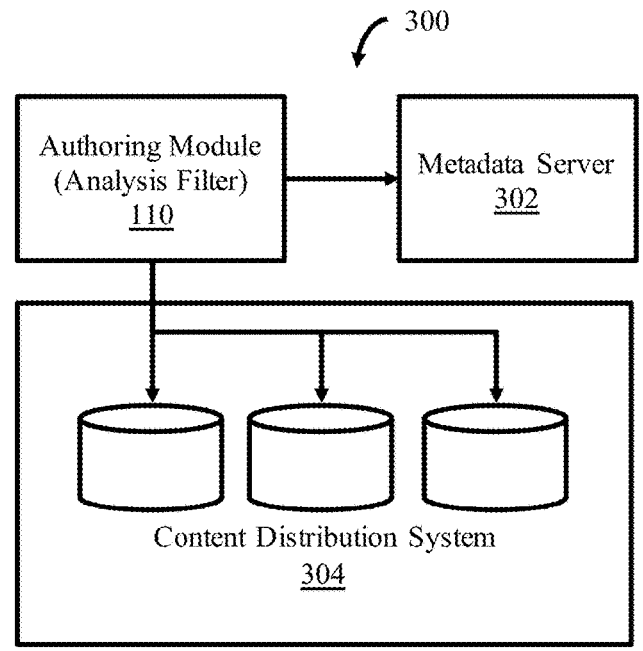
FIG. 3 illustrates, in block diagram form, a metadata server and a content distribution system utilizing the authoring system of FIG. 1 according to some embodiments.

FIG. 3 illustrates, in block diagram form, a metadata server and a content distribution system 300 utilizing the authoring system of FIG. 1 according to some embodiments. Metadata server and a content distribution system 300 includes authoring module 102, metadata server 302, and content distribution system 304. According to this embodiment, authoring module 102 generates media subsequences in accordance with one of the earlier described exemplary variants and delivers these media subsequences to a content distribution system 304 serving destinations where content may be displayed or archived. As described above, the authoring module 102 further generates metadata which are forwarded to a metadata server 302. Metadata provide information which is ancillary to the actual subsequence bit streams, e.g., specifying (i) analysis filter characteristics on whose basis a client can invoke a corresponding reconstruction filter, (ii) the number of subsequences, two or more, which are needed for reconstruction of the original sequence, (iii) identifier information for subsequence and reconstruction logic data, typically in the form of filenames or other locator information, (iv) protocol information for subsequence access, and (v) rules for the client, e.g., as to download sequencing.

In the case of splitting a time-based media sequence 200 into a pair of subsequences, one of the subsequences may play the role of a bulk file containing most of the content, and the other that of a complementary delta file. As to subsequence file identification, unique naming is straightforward in a centrally controlled system, by following a chosen format assigned to a media title. In a distributed system allowing independent entities to use the authoring system, a name server can act as a mechanism for preventing subsequence identifier conflicts. The authoring module 102 then can query the name server for unique identifiers for each new media title to be introduced into the distributive system. Further concerning protocols associated with subsequences, different sequences may be specified for downloading or streaming, for example, and for downloading there may be a specification of priority of one subsequence over another.

Figure 4:
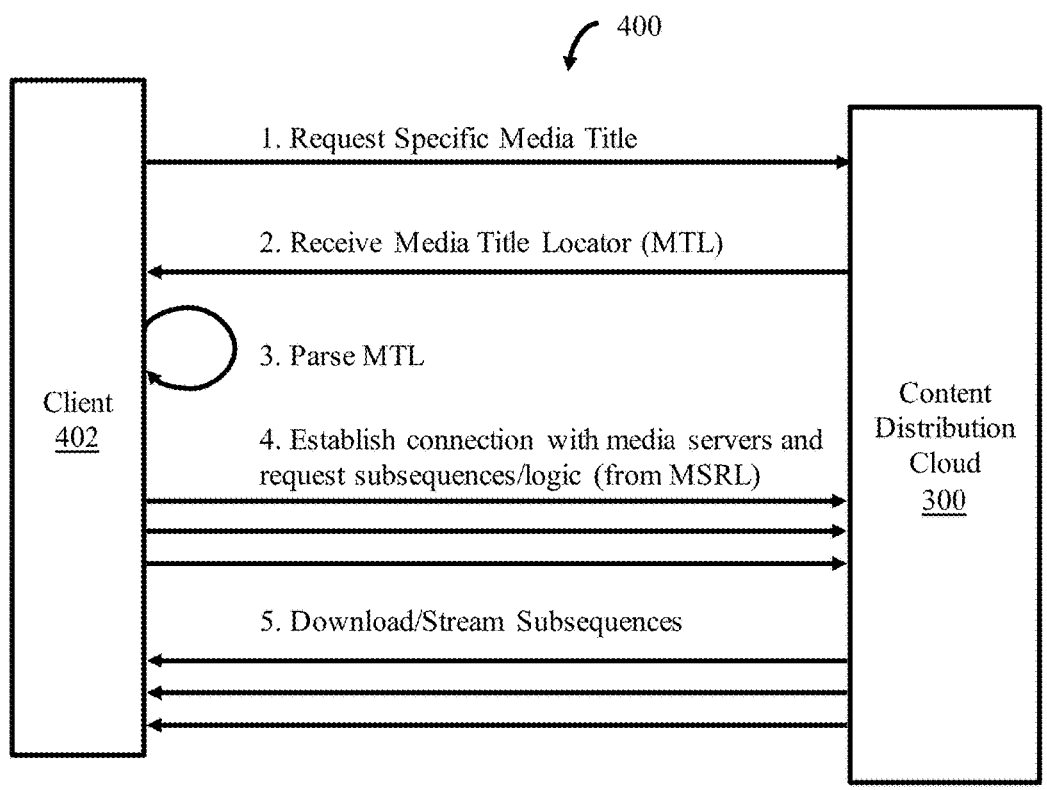
FIG. 4 illustrates, in block diagram form, an exemplary embodiment of an interaction in a media distribution service, between a client and a content distribution system, according to some embodiments.

FIG. 4 illustrates, in block diagram form, an exemplary embodiment of an media distribution system 400, specifically the interaction in a media distribution service 400 between a client 402 and a content distribution system 300 or "cloud", according to some embodiments. According to this exemplary embodiment, such a service can utilize existing media distribution systems and infrastructures, e.g., the Internet. For a client 402 to access media files, certain supporting systems are provided. In the exemplary embodiment, a client or client application is considered who requests audio playback of a media title A (see, 1. Request Specific Media Title). On the query, "play A", the client 402 receives a reply from the media distribution service including instructions for deciphering the subsequence access information and for reconstruction of the title from the subsequences (see, 2, Receive Media Title Locator (MTL)).

The reply, designated as Media Title Locator (MTL), includes access information for the subsequences and reconstruction information for their assembly, with information associated with a subsequence being termed as Media Subsequence Resource Locator (MSRL). The MSRL of a subsequence includes media server information, access protocol information, and the subsequence file name. In case the reconstruction logic is not bundled with the subsequence, the MSRL also includes information for accessing the corresponding logic. The MTL includes information on analyzer filter characteristics, the number of subsequences, download priorities, and the like. Accordingly, the MTL includes several MSRLs and other relevant metadata.

The client 402 parses the MTL (see, 3. Parse MTL), establishes a connection with media servers residing in the content distribution system 300, request subsequences/logic as a function of the MSRL (see, 4. Establish connection with media servers and requests subsequences/logic (from MSRL), and downloads the subsequences and reconstruction logic following the instructions which are included in the MTL/MSRLs (see, 5. Download/Stream Subsequences). The client 402 then reconstructs the media sequence from the media subsequences and their reconstruction logic, for playback of the result by standard media playback utilities.

Figure 5:
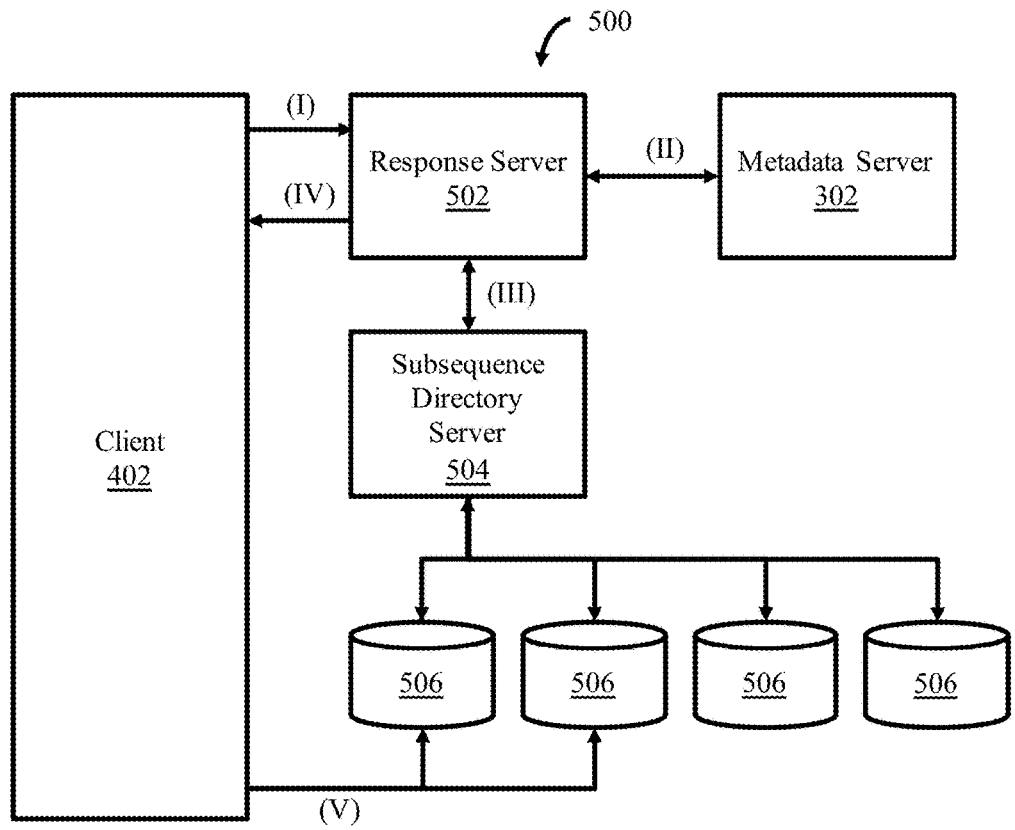
FIG. 5 illustrates, in block diagram form, one exemplary operation of a media distribution service, according to some embodiments.

FIG. 5 illustrates, in block diagram form, one exemplary operation of a media distribution service 500, according to some embodiments. Media distribution service 500 includes a client computer 402, response server 502, metadata server 302 which may be a local application, subsequence directory service 504, and media servers 506. The following sequence is illustrative of the operation of media distribution service 500:

(I) The client 402 submits its request for a media title to the media distribution response server 502.

(II) The response server 502 queries the metadata server 302 to retrieve one or several required subsequences, logic and any other relevant information.

(III) The response server 502 queries the directory service 504 for the locations of the individual subsequences/logic, with the directory service 504 possibly having intelligence for choosing optimal locations in a case where a subsequence can be obtained from different locations.

(IV) The response server 502 combines the information to form the MTL and sends it to the client 402.

(V) The client 502 parses the MTL, opens connection with the individual media servers to obtain the subsequences/logic.

File distribution can involve an available mechanism, e.g. client-server distribution, edge-of-network/push caching, pull caching as in standard passive caching and peer-to-peer file sharing. Such mechanisms may be categorized as being of one of two types, media server versus directory service.

The role of a media server, central or distributed, includes storing the subsequences, and serve or stream them on demand to any requesting client. In more detail, the media server storing subsequences includes storing distorted visual media. For example, a central server can be used in a service where a user can download or stream directly from a main service provider in a client-server mode. In a distributed service, the same content can be replicated at multiple locations within a network, e.g., in peer-to-peer file sharing where the media servers can be located on other service users' devices. Similarly, in edge-of-network caching, a file sharing service replicates a file at multiple locations at "edges", such as mirrors and proxies of the network, but in a more controlled fashion as compared with peer-to-peer. A further example for a server includes cache proxies in the network for storing recently requested information.

Subsequences can be made available as downloaded or streamed, and, in streaming, multicasting can be provided for multiple users to listen to the same song, for example. When subsequences are not encrypted or otherwise constrained, they can be copied to disk, transferred, removed, backed up and the like.

In a directory service, a listing/record is maintained of the locations of the individual subsequences, for supporting a querying interface. In a centralized system, the directory service can be a simple database on a single server. In a decentralized service, e.g., peer-to-peer, multiple users can each have a copy of the same file, with availability varying as a function of who is logged on. In an edge-caching service, where segment files are replicated at different nodes in a network, the directory service is a centralized entity that keeps track of the file locations for directing the client to the nearest cache.

Figure 6:
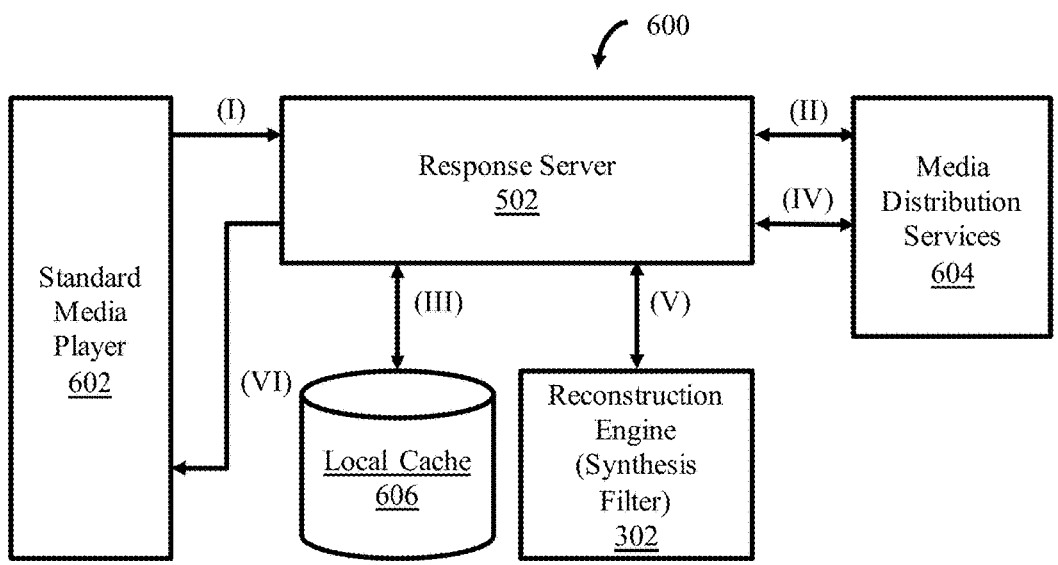
FIG. 6 illustrates, in block diagram form, operation for playback of a media file through a client's media player, according to some embodiments.

FIG. 6 illustrates, in block diagram form, operation for playback of a media file through a client's media player 602, including the following steps:

(I) The client's standard media player 602 submits its request to the media distribution response server 502.

(II) The response server queries the metadata server 302 in media distribution service 604 to retrieve subsequence, logic and other related information for the requested media title.

(III) The response server 502 queries the directory service 504, here illustrated as local cache 606, for the locations of the individual subsequences/logic. The directory service 504, i.e., local cache 606, may have intelligence for the best locations to choose.

(IV) The response server 302 in media distribution service 604 combines the information to form the MTL and sends it to the client's standard media player 602.

(V) The client's standard media player 602 parses the MTL, opens connection with the individual media servers and downloads/streams the appropriate subsequences/logic.

Further operations may be included, e.g., checking whether a title being requested already is present in a client's local cache. Such a check may be performed early in processing or later, e.g., after the subsequence locations have been identified, as operations can be arranged in any logical fashion. Also, depending on the reconstruction scheme, the client subsystem can pass along partially reconstructed media files. Where a filtering mechanism is used to allow reconstruction of a low-quality version from a limited number of subsequences of a media file, disconnected playback can be provided for, i.e., from cached subsequences even when the client computer is disconnected from the network.

A media distribution system as illustrated above can be implemented for a variety of uses including an online media locker, online jukebox, chat room, or advertising means. In an online media locker, users can store digital media content they already own, e.g., from a CD, enabling the user to access the content from any computer connected to the network. If allowed by the content provider, storing may be of the fully reconstructed file, or of a lower-quality version. Also, an original file may be split into one portion which can be downloaded, and another to be obtained by streaming from a server whenever playback is desired. In the case of an online jukebox, subscribers have access to music in a database. Users may obtain portions of music for downloading, of a quality which is inadequate for satisfactory playback and requiring a complementary portion which may be obtained by relatively low-rate streaming. To enable users interacting in a chat room simultaneously to listen to the same music, streams can be multicast such that the streams trigger playback. From users, comments may be overlaid on the music.

Other media, e.g., images or video can be distributed correspondingly, with partitioning of original data based on the technique of the invention. And application of the technique is not limited to visual and auditory media, but can extend to tactile media, for example.

Here of particular interest is the delivery of digital media data in compressed form. Compression as exemplified below is used in numerous media applications such as speech, audio and video, including DVDs, broadcasting by cable or satellite, and streaming video over the Internet. A media sequence can be partitioned in the course of compression-encoding prior to transmission, under standards such as MP3, MPEG-2 or MPEG 4, into subsequences which can be decoded by a corresponding standard decoder. Alternatively, a media sequence that is already in compressed format can be read and parsed for partitioning. Depending on the application, the partitioning can be effected during compression, or later on the compressed stream. Similarly, recombination can be effected in the course of decoding or before. In the latter case, decoding need not be immediate, as the recombined stream can be stored for future decoding.

Data Compression

Figure 7:
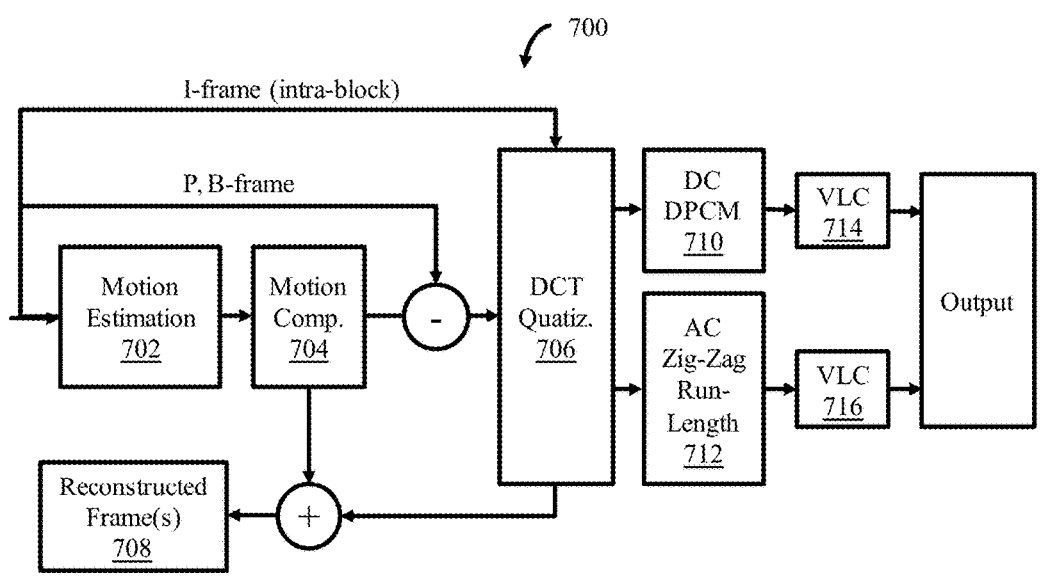
FIG. 7 illustrates, in block diagram form, an exemplary embodiment of encoder for data compression.

With reference to FIG. 7, compression is described for the important case of video. Most video compression methods in current use are based on a similar structure, which can be said for ISO MPEG-2 video coding standard as used in DVD's and in most broadcast applications, the ITU H.26x series of standards for video conferencing, and the ISO MPEG-4 standard used by numerous video streaming and download applications. Certain aspects of the description readily carry over to other uses of lossy compression, as corresponding techniques having similar structure are known in the art, e.g., for audio and speech. For example, specifically, MP3 encoding includes transform and quantization. Likewise, single-image coding algorithms employ a similar structure, though without motion compensation.

FIG. 7 shows a basic structure for a compression system, including a motion estimation module 702, a motion compensation module 704, a transform and quantization module 706, a reconstructed-frame memory 708, a DC differential pulse code modulator (DPCM) 710, an AC zig-zag run length module 712, and variable-length coders 714 and 716. Functionality of modules involves the following:

DCT Transform.

From input blocks of pixels, typically blocks of size 8 by 8, the same number of samples of the frequency contents of each block are generated, typically called frequency coefficients. This transform is invertible, so that, if no further processing is performed, the original pixel values can be recovered by applying an appropriate inverse transform. The output coefficients represent the information content of each input signal in the frequency domain. The transforms provide significant energy compaction, i.e., for typical images the number of frequency coefficients needed to provide a good representation of the signal tends to be small. While DCT (Discrete Cosine Transform) is prevalent in current data compression techniques, use of other transforms, e.g. wavelet transforms, is not precluded. Wavelet transforms are used in the JPEG 2000 standard and are likely to find use in video coders.

Quantization.

The frequency coefficients, which can take any real values within an interval that is known beforehand, are quantized to the closest among a discrete set of values. Thus, the quantized coefficients take only a discrete set of values. This operation is lossy, amounting to a many-to-one mapping, and cannot be inverted.

Entropy Coding.

Also known as variable-length coding, the quantized values are represented by specific variable-length codes designed such that the most likely quantized values are assigned shorter code lengths. This process is lossless, i.e., the mapping from quantized value to code is one-to-one, and once the coded symbols have been concatenated for transmission there is a unique way of parsing the bit stream to obtain the individual codes.

Motion Estimation and Compensation.

As video sequences are composed of frames that exhibit substantial temporal correlation, i.e., consecutive frames are very similar, techniques for motion estimation and compensation are used. Motion estimation is only performed at the encoder, while motion compensation is performed at both encoder and decoder. Motion estimation consists of dividing a current frame into blocks, typically 16 by 16 pixels in size, and for each block finding the block in a specified region in the previous frame that most closely matches it. If the match is sufficiently good, then a motion vector is transmitted and the difference between the block in the current frame and the best-match block from the previous frame will be compressed and transmitted. Otherwise, if the match is not sufficiently good, the block in the current frame will be compressed directly, without subtraction of any information from the previous frame. There are various modes of motion estimation/compensation based on this principle.

Data Partitioning

For implementation of an exemplary technique in accordance with the invention, the encoder can be modified for removing information in the course of encoding. Then, after such partial removal of information, the output from the encoder can be taken as a first subsequence, with the removed portion as a complementary subsequence. As an alternative, in the interest of efficiency, an analyzer filter can be formed for combining partial decoding of a compressed file with removal of information for partitioning.

For removal of information it is desired to adhere to syntax-compatible strategies in the sense described above, for at least one of the subsequences, typically the one containing the bulk data. The following are examples of such strategies:

AC Coefficients.

In a standard video encoder, the AC coefficients are coded with a variable length code (VLC) where two dimensions are encoded, run-length and magnitude. Escape codes are used for all values outside the table of codes. According to one embodiment of the invention, selected AC coefficients are set to a specified value, e.g., zero, with the actual value placed in a supplementary stream. Because of the run lengths, if any coefficient is changed to zero, as the run of zeros now has become longer, this alters not only its code but also the code before it. Therefore, some form of re-encoding of the block may be needed.

Zeroing the AC coefficients distorts the image texture, leaving an unappealing, though recognizable sequence. Another option is to set the sign of certain AC coefficients to be positive. This creates highly distorted bit streams with very small supplemental streams, as only one bit needs to be written for every non-zero AC coefficient. In this case no re-encoding is necessary, as changing the sign does not affect the Huffman code for the magnitude-run length. A third option is to remove the coefficient and replace it with a number indicating the distance to the next bits that will be changed. A fourth option is to remove the coefficient without replacement, resulting in a shift, by one, of all the following coefficients in the zig-zag scan.

The AC coefficients are appealing for encoding a distance because their range is from −2048 to 2048 (but not zero). This is long enough in most cases, and, if need be, two coefficients can be used to code the jump, making for 24-bit distance. Adding this much error to the AC values creates a highly degraded image, where it is practically impossible to recognize the original image. However, a large part of the degradation in quality stems from long distances resulting in large coefficients. Therefore, someone trying to increase the quality of the subsequences might be able to detect these larger-than-usual values and set them to zero.

The AC methods considered share a property in that the larger the difference between an original value and its replacement, the greater the loss in image quality. Such quality scalability is advantageous for customizing the level of quality in a first subsequence.

Comparing the different options in terms of complexity, zeroing coefficients is the most complex, requiring some recoding of the block. Resetting coefficient signs is simple and results in greater distortion. Replacing coefficients has the advantage of a recombination filter of low complexity, as recombination can skip bits without parsing them, but provides less control over the quality of a resulting first subsequence. Removing coefficients without replacement has complexity similar to zeroing, with a potential advantage in introducing significant quality degradation even if just a single coefficient is removed.

For choosing which AC coefficients to change, the following are among options: (i) the N largest coefficients of a block; (ii) the first N coefficients of a block; and (iii) the coefficients that provide the maximum average energy over a subset of the sequence, e.g., a frame or a group of pictures (GOP). A further possibility lies in selection of blocks for coefficient removal, e.g., Intra blocks only, or luminance component only. Some of these options then require that auxiliary information be provided in the supplemental stream(s). For example, if a different set of N coefficients is chosen on a frame-by-frame basis, the set should be characterized for each frame.

DC Coefficients.

DC coefficients are differentially coded, with a new sequence starting at the beginning of each line of 8 by 8 blocks. The first value of a new line is between 0 and 255. The difference values range form −255 to 255. All coefficients are variable-length coded. Altering the DC vectors impairs the fidelity of the video and has a number of options. Zeroing the vectors produces marginally acceptable video in which some of the video contents can be made out. As for the AC coefficients, altering the signs of the DC differentials is another choice. Because the range of differential vectors is from −255 to 255, if all signs are set in one direction, e.g., all positive, or even if a single sign is changed on a chosen line, the predicted DC value of a block can be outside the 0-255 range. Thus, an attacker might be able to determine that a particular sign should be changed when out-of-range coefficients are observed.

Many practical media players simply truncate the DC values if they fall out of range. Still, if a sufficient number of DC values are changed, our experiments indicate that some recovery is possible by utilizing the out-of-range values, though images of good quality are difficult to recover because there are many possible combinations of sign values, inhibiting automatic differentiation. This option offers essentially complete scrambling of the video frames. As for the AC coefficients, it is possible to remove the DC values and replace them by values that indicate the number of bits to be skipped to reach the next bit position that has been modified. As a benefit, the complexity of the recombination filter is reduced. Also, as for the AC coefficients, removal of information can be from all blocks, from the Intra blocks alone, from the luminance blocks alone, or from both luminance and chrominance blocks.

Motion Vectors.

The motion vectors (MV) are coded using three (3) elements for x and y displacements, a magnitude element, the normal motion vector, and a residue. Also, there is ancillary information, e.g., indicating whether full-pixel or half-pixel is used, or, in the case of B-frames, whether forward, backward or combined prediction was used. Modifying motion vectors is less effective in slow moving video, and even in panning and fast motion sequences the viewer may be able to follow by tracking the I-frames. The length of the GOP makes a significant difference in video quality, as longer GOP's are more distorted than short ones.

Here again zeroing out all MV's is one option, taking an acceptable number of bits as motion vectors are coded only once per macro-block of four 8 by 8 pixel blocks. Other possibilities include eliminating the sign information in the MV's. However, in changing the sign of the MV's there may be risk. Motion vectors are coded differentially, and their allowed range is relatively small. Unlike AC and DC coefficients, out of range values are not readily dealt with. As illegal MV's are usually not checked for, they can cause memory to be read from locations beyond the image's range. This can add large distortions, making it likely that some decoders would be unable to decode such streams.

A further option involves eliminating the MV temporal direction information for each block of a B-frame. As is typical in MPEG syntax, a code table can be used to represent each of the possible values of this information, along with other parameters. Thus, when the temporal direction information takes a certain value, the code that is used is not unique but depends on the values taken by the other parameters encoded. For elimination of the MV temporal direction information therefore, one multi-bit code has to be replaced by another where the temporal direction has been modified. Other options that are applicable to most of the above include coding only P-frames or only one of the MV directions.

Combination of Techniques.

It is feasible to change multiple elements of the bit stream. Not only will this reduce the quality, but may also make unauthorized decoding more difficult, thus enhancing security. Also, certain techniques as described above can be combined with known scrambling techniques. For example, after removing one or more AC coefficients, the order of the remaining coefficients can be altered according to a standard scrambling technique.

Complexity Issues.

If the combine filter is tightly coupled with the decoder, then the stream needs to be decoded only once, and the techniques described here are straightforward to implement and will add only minor processing requirements to the decoder. Otherwise, the stream has to be partially decoded, partially re-encoded and then sent to the second decoder for decoding and display. Partial decoding need not require the iDCT or the motion compensation, but still require decoding of the MV's for maintaining synchronization with the stream, as well as other elements, including the AC coefficients. Further speedup can be realized by skipping complete frames in the process, i.e., by not removing any information from some of the frames.

Complexity can be reduced also by including in the modified bit stream codes that indicate the number of bits to be skipped for reaching the successive locations where removed bits have to be reinserted. One option here is to code in a swap-and-skip format, where the filter swaps a number of bits, e.g. an AC coefficient, and then skips ahead and repeats the process. It may be feasible to embed the skip section within the primary stream by placing it at points where it will be skipped by the decoder or overwritten by the filter as it works its way through the file. For example, each DC coefficient may be replaced with the number of bits until the next DC coefficient. The supplemental stream then contains only the coefficients packed together, and the filter can run through the file quickly, swapping and skipping.

In implementing such a seek-and-swap method, one concern arises from the fact that the number of bits allowable for skipping actually depends on what the MPEG format permits for a specific coefficient. As an example, if the DC coefficients are used then there is a range of 256 values for unpredicted blocks, and of 512 for predicted blocks. Therefore, skipping is constrained to 256 or 512 bits. While most block sizes are considerably less than 256 bits, larger blocks may have to be accommodated. AC coefficients may present a better choice, as they provide 4096 bits of precision. However, if AC values are used to convey this information, an attack consisting of zeroing out the coefficients may be successful, yielding a degraded but perhaps useable decoded sequence. With skip-and-swap techniques there is a further concern with quality control in that no choice is available for the values to be inserted, as they correspond to the length in number of bits of the segment to be skipped.

Choice of method will depend strongly on how closely the combining filter is linked to the decoder. If the linking is close, skip-and-swap methods may be decided against as less resilient to error and more intensive in overhead. In this case, changing a combination of the AC and DC signs is preferable. This yields a supplemental stream with typical values of less than one percent of the original file size, without changing the size of the original. If the decoder is not closely linked, it may be preferable to code the bit offset in the DC coefficient, with an escape code for values out of range which then can use the first AC coefficient. At high speed, potentially, this will eliminate enough information to render the residual stream essentially unrecognizable. If a very small stream is needed, another possibility lies in coding the offset to the next GOP in the signs of the DC blocks, so that most of the stream would not need to be decoded, only the I-frames.

Choice from among partitioning techniques and combinations of techniques can be made by the content owner or the service provider, for meeting requirements on the quality of the bulk file and the size of the supplemental stream.

A technique of the invention can provide for removal of either DC or AC information, selectively depending on the degree of image degradation desired for a scene in a video sequence. Such dependence can be selected to advantage for providing a file with a preview functionality, for example. When informed as to which scenes have been degraded lightly, a user can view these scenes as a preview of the complete sequence on the user unit such as a PC or a mobile device.

Optimization of Data Removal

As described, the level of protection offered by our techniques depends on the number of values that can result in a valid bit stream in the position where data has been removed. For example, when a differentially encoded DC coefficient is removed, there are exactly 512 different values possible in that position. To reconstruct the original compressed signal, a hacker would have to guess which among the 512 possible values is the right one. Likewise, if an AC coefficient has been removed, there are 4096 possible values to replace the missing coefficient. In practice, all the values for the missing information are not equally likely because the original coefficients themselves are not equally likely. As an example, even though a differentially coded DC coefficient can take any of 512 values, coefficient values close to zero are considerably more likely. Thus, the probability distribution of each coefficient might be used by an attacker in order to limit the number of values to be tested. The distribution of these probabilities is linked also to the cost of compressing the coefficient values that have been removed.

In a pilot implementation, for deciding which data to remove we have used an extension of the Lagrange multiplier technique. In formulating and solving we set the goal of information removal such that: (i) the number of bits required to represent the removed information is small, limiting the size of the supplemental stream; (ii) the increase in distortion when removing the information is large; and (iii) the number of possible alternatives among which an attacker has to guess is also large. Formulation is facilitated by notation as follows: $R_i$—the number of bits needed to represent the removed information in a supplemental stream; $D_i$—the increase in distortion caused by the removal; and $N_i$—the total number of options to choose from in order to restore the data to its original quality. As an example, when the DC sign is set to "always positive", Ri equals one bit per DC coefficient, Di depends on both the change in the coefficient itself and on the subsequent DC coefficients which will be affected in differential coding, and Ni equals two (2). For optimal information removal, the goal can be the maximizing of a weighted cost function, namely Di+k−Ni, where k is a Lagrange multiplier allowing emphasis on distortion or level of protection in optimization.

When considering the number of options available for specific data that has been removed, the number of "good" options can be approximated by the entropy of the random variable representing them. For example, when a sign is removed, the two options typically have the same likelihood. Alternatively, when an AC coefficient has been removed, there may be up to 4096 values available for that coefficient; typically, however, only the smaller $2^{Hi}$ values are a likely choice, where Hi is the entropy of the coefficient. Thus, an attack may succeed just by choosing among those values.

A strategy can take into account the recognition that in removing coefficients with a certain entropy Hi, the total number of combinations of coefficients is $2^{nHi}$ rather than $2^{nNi}$ where n is the number of coefficients that have been removed and Ni is the number of bits required to represent the uncompressed coefficient. Thus, the level of protection achieved is directly related to the number of bits required to represent the information that was removed, and an approximate formulation for optimization calls for maximizing Di+k−Ri, where a large value is desirable for Ri in that it represents a large number of options to be chosen in order to restore the data.

Techniques of the invention can be implemented in software, for a processor to follow program instructions stored in memory. It was with such an implementation that experimental results were obtained as presented below. For commercial use, in the interest of enhanced efficiency, use of firmware and/or dedicated hardware is indicated, e.g., at a network gateway. Whether by hardware, firmware or software, the techniques can be implemented as separate modules, or their functions can be integrated in encoder and decoder modules.

Experimental Results

Experiments were carried out with a stream of 20,329,573 bytes, of a 60-second clip taken from the movie True Lies. The results are shown in Table 1, where the left-most column identifies the different splitting strategies used. Table 1 further shows the size of the supplemental stream which was split off using the respective strategy, before as well as after compression, and the size of the main stream after removal of the supplemental stream. The notation "same" indicates high stream entropy making compression less relevant. Size values shown in parentheses are approximated, by the entropy value. The MPEG 2 Huffman Table was used for the other, exact values given for the compressed supplemental stream.

The results demonstrate reverse scalability as achieved by techniques of the invention. The size of the bulk file remains close to the size of the original file, and the supplemental streams are small by comparison. Even the supplemental file including the most information, namely the one conveying selected AC coefficients, remains less in size than 10% of the original file. When only the signs are removed, either of AC or DC coefficients, respective supplemental files of approximately 1% and 0.2% in size are noted. Techniques including removal of the DC coefficients or their sign result in highly degraded video sequences. Upon removal of the AC coefficients or their sign there results a moderate decrease in quality.

TABLE 1

| | Supplemental Stream | | |
|---|---|---|---|
| Test | Uncompressed | Compressed | Main Stream |
| DC signed | 48,818 | same | 20,329,573 |
| DC rand | 593,684 | 417,822 70% | 20,544,435 |
| DC zeroed | 593,684 | 417,822 70% | 20,087,643 |
| AC signed (first 10) | 250,205 | same | 20,329,573 |
| AC zeroed (first 10) | 7,124,195 | (1,300,000) 17% | 19,064,058 |
| AC rand (first) | 1,385,261 | (350,000) 35% | 21,620,664 |
| MV zeroed | 2,639,989 | 571,687 22% | 19,882,784 |

The results demonstrate reverse scalability as achieved by techniques of the invention. The size of the bulk file remains close to the size of the original file, and the supplemental streams are small by comparison. Even the supplemental file including the most information, namely the one conveying selected AC coefficients, remains less in size than 10% of the original file. When only the signs are removed, either of AC or DC coefficients, respective supplemental files of approximately 1% and 0.2% in size are noted. Techniques including removal of the DC coefficients or their sign result in highly degraded video sequences. Upon removal of the AC coefficients or their sign there results a moderate decrease in quality.

What is claimed is:

1. A method for delivering media data of a type produced by an imaging device, comprising the steps of:
    (a) forming a plurality of subsets of said data, comprising a first subset which conveys a first, degraded quality representation of said data and at least one further subset here designated as a second subset which in combination with the first subset conveys a second representation of said data with quality superior to said first representation, the second subset including imaging device specific information chosen to enable a selected one of a classification and identification of the imaging device having produced said data; and
    (b) delivering at least one of said first subset and said second subset to at least one destination.

2. The method of claim 1, wherein step (a) comprises the step of optimization utilizing a cost function that combines media content and imaging device specific information.

3. The method of claim 1, wherein step (b) further comprises a selected one of downloading and streaming.

4. The method of claim 1, wherein the data comprises audio.

5. The method of claim 4, wherein the data is in MP3 format.

6. The method of claim 1, wherein the data comprises video.

7. The method of claim 6, wherein the data is in a selected one of MPEG-2 and MPEG-4 format.

8. A method for delivering media data of a type produced by an imaging device, said method comprising the steps of:
 (a) forming a plurality of subsets of said data, said plurality of subsets comprising:
  a first subset which conveys a first, degraded quality representation of said data;
  a second subset which in combination with said first subset conveys a second representation of said data with quality superior to said first representation; and
  wherein said second subset includes imaging device specific information chosen to enable a selected one of a classification and identification of the imaging device having produced said data; and
 (b) delivering at least one of said first subset and said second subset to at least one destination.

9. The method of claim 8, wherein step (a) further comprises the step of optimization utilizing a cost function that combines media content and imaging device specific information.

10. The method of claim 9, wherein a selected one of said first subset and said second subset is encrypted.

11. The method of claim 10, wherein a selected one of said first subset and said second subset is delivered through a secure network.

12. The method of claim 8, wherein a selected one of said first subset and said second subset is encrypted.

13. The method of claim 12, wherein a selected one of said first subset and said second subset is delivered through a secure network.

14. A method for controlling access in a social media network to a visual media data of a type produced by an imaging device, said social network comprising a plurality of user units coupled to a social network site server, said social network site server being coupled to a database and a media server storing visual media posted by users of the social network, each of said plurality of user units comprising a processor and a display, the method comprising the steps of:
 (a) receiving, by a visual media server, said visual media data from a selected one of the plurality of user units;
  said selected one of the plurality of user units executing a client application;
  said client application operable to form a plurality of subsets of said visual media data, said plurality of subsets comprising:
   a first subset which conveys a first, degraded quality representation of said visual media data; and
   at least one additional subset which in combination with said first subset conveys a second representation of said visual media data with quality superior to said first degraded quality representation, wherein said at least one additional subset includes imaging device specific information chosen to enable a selected one of a classification and identification of the imaging device having produced said data; and
 (b) making said visual media data available to a least one destination, said destination comprising at least one of said user units, said user unit having a predefined user access level.

* * * * *